UNITED STATES PATENT OFFICE.

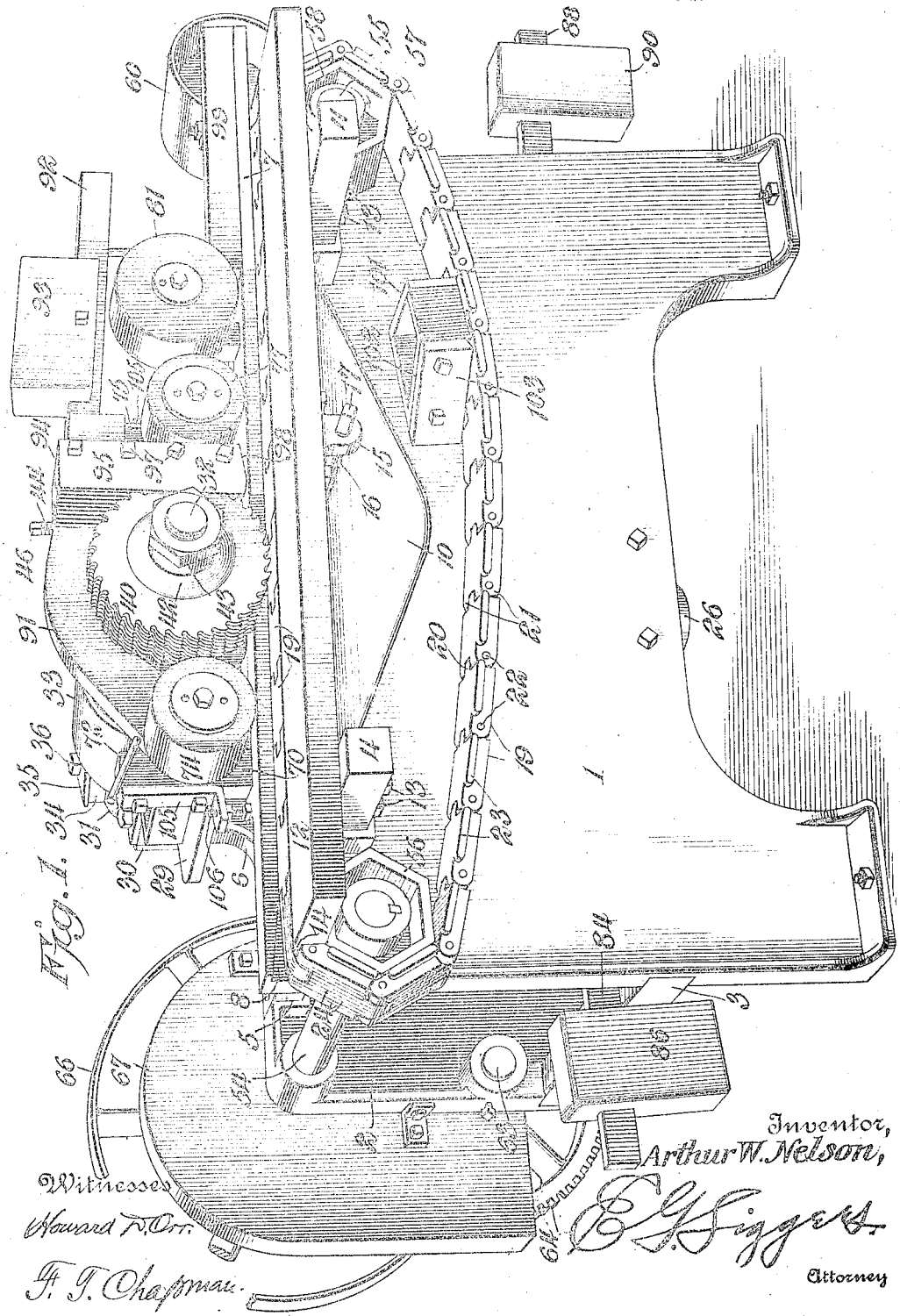

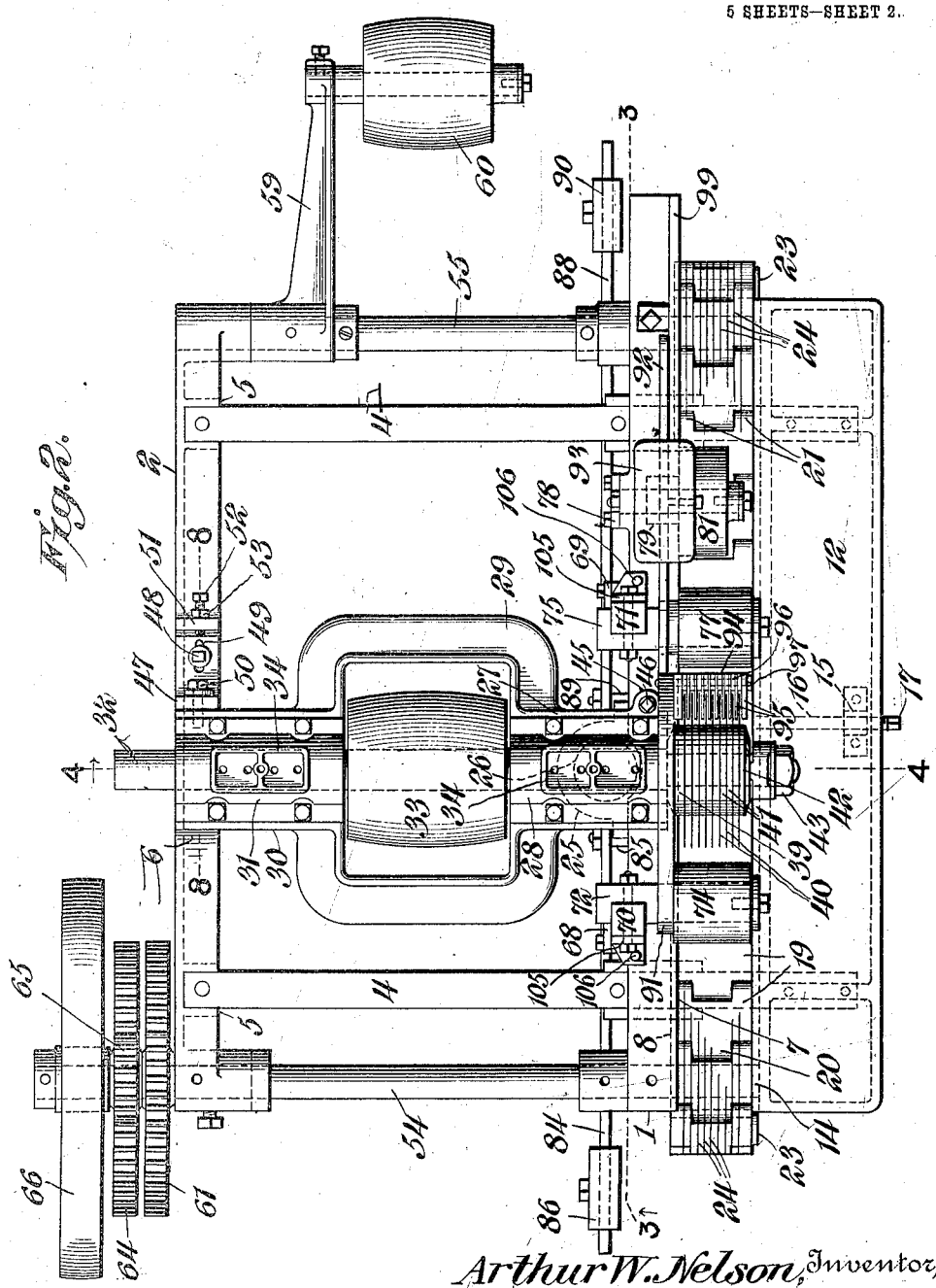

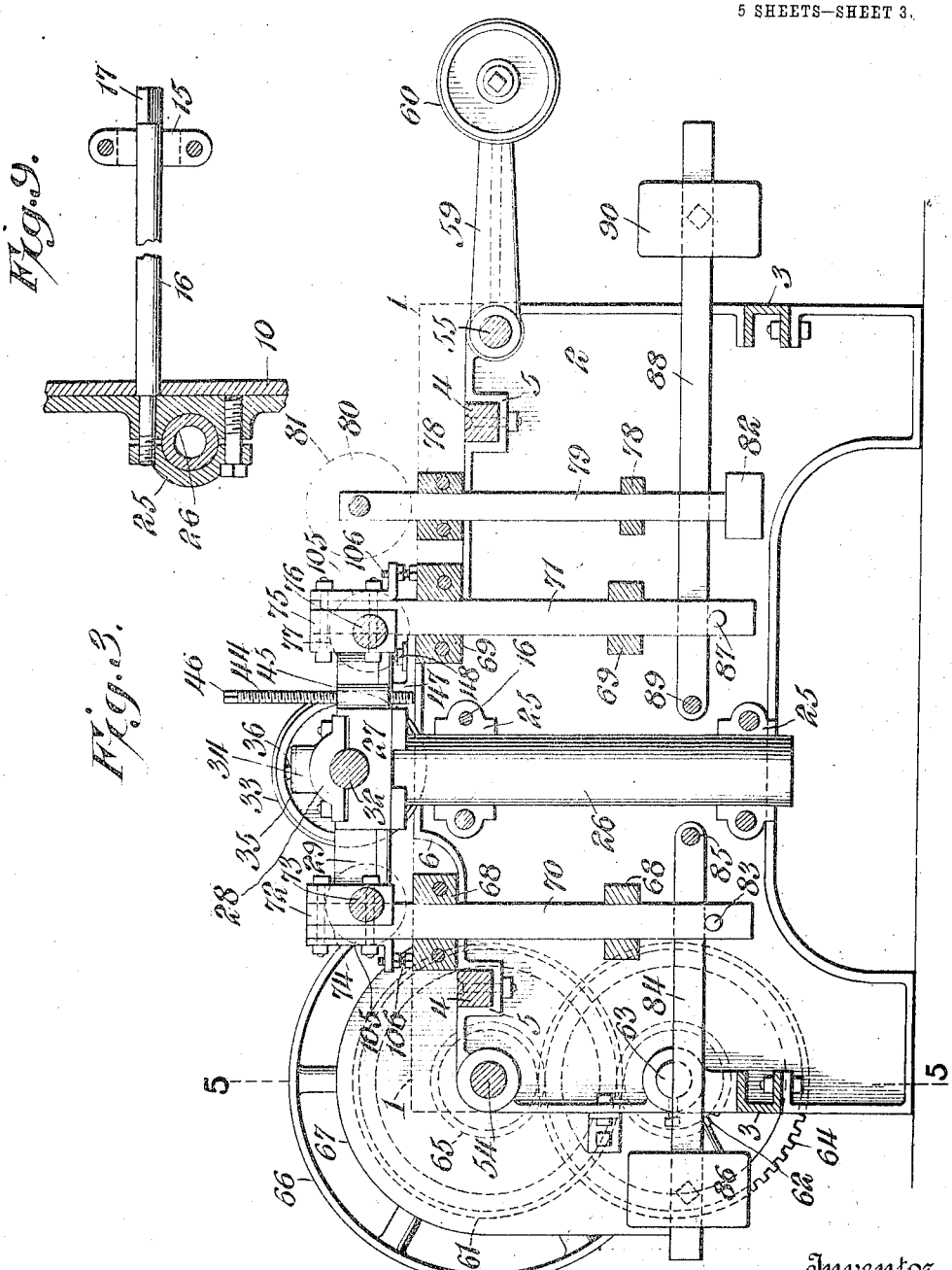

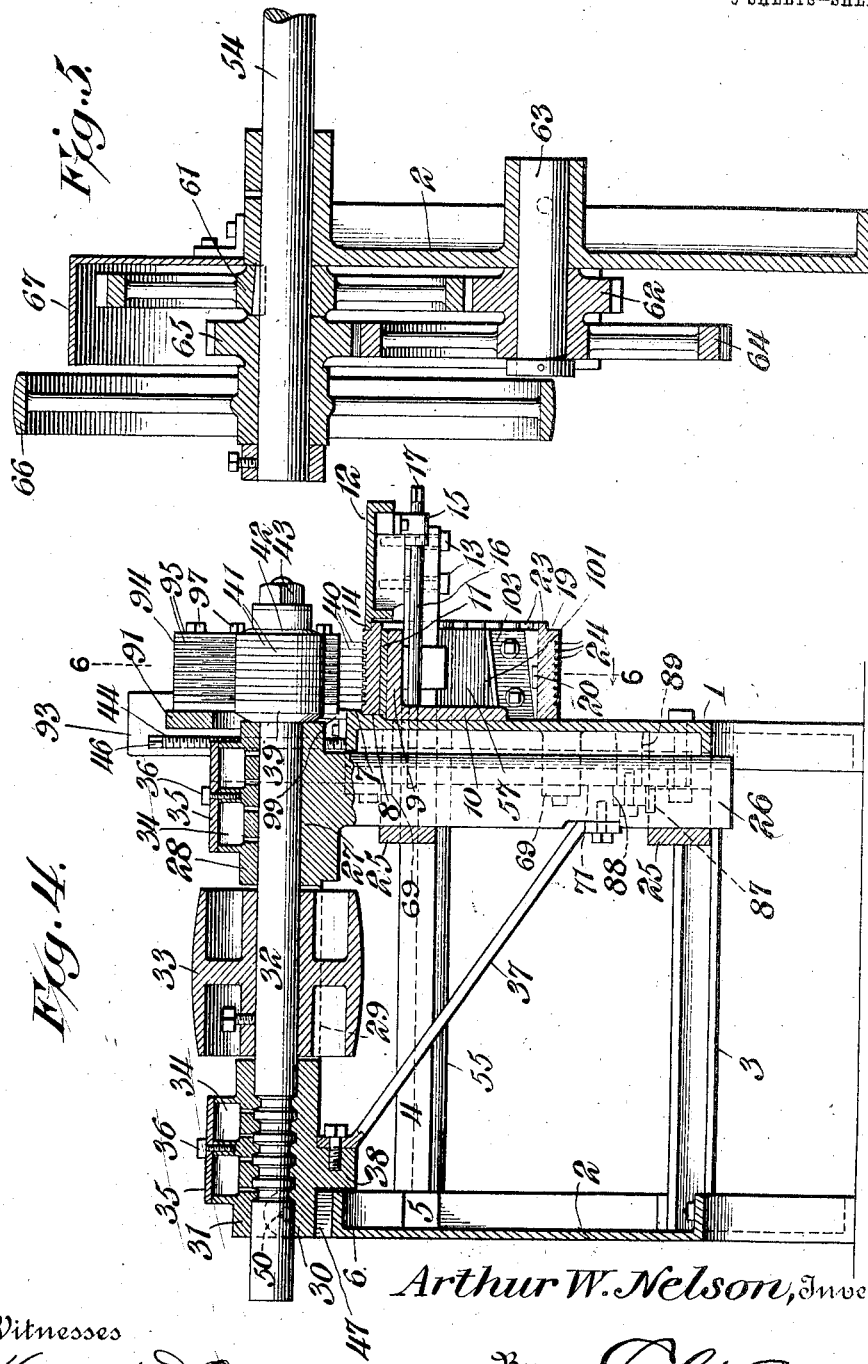

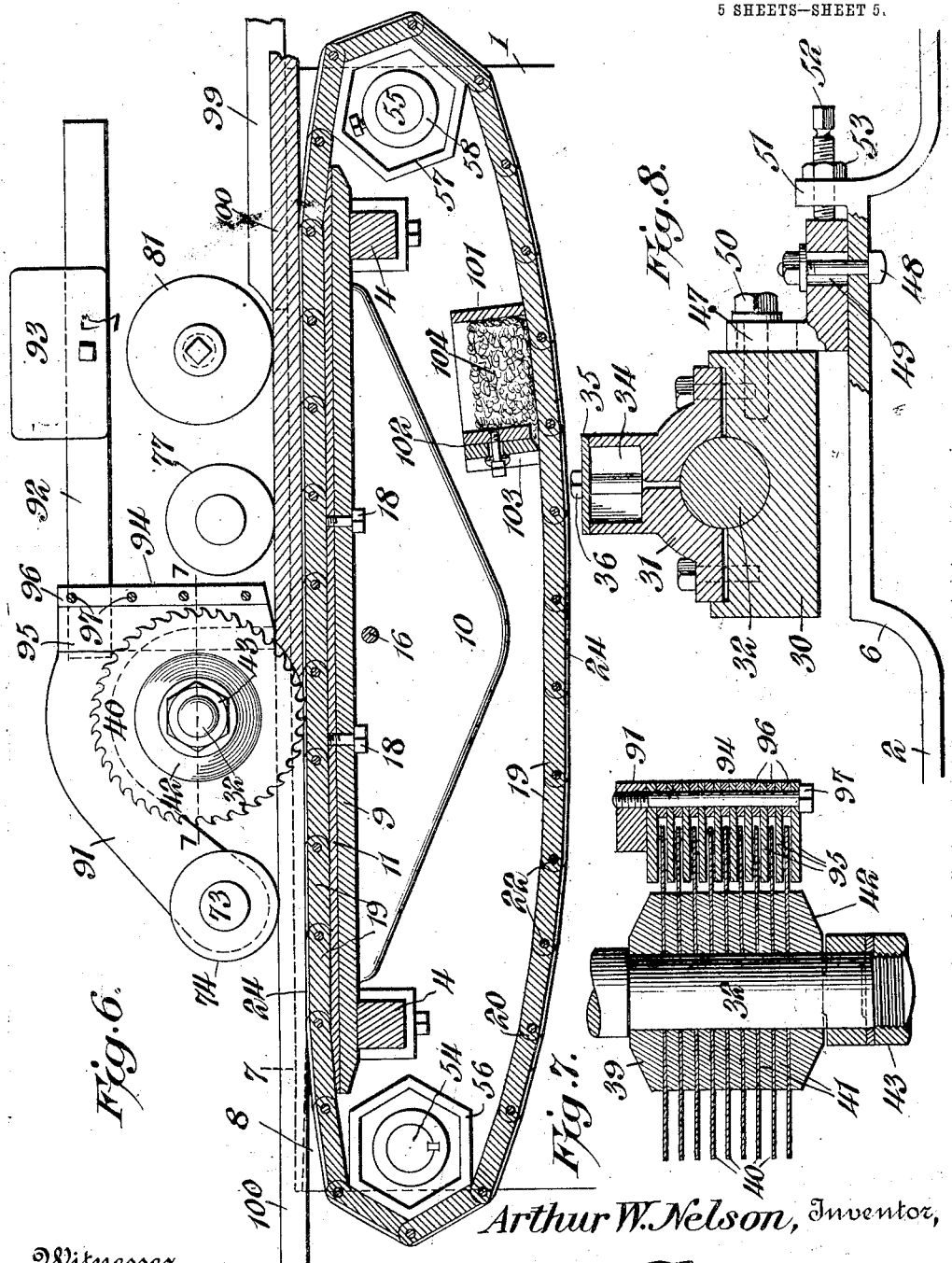

ARTHUR W. NELSON, OF WILLIAMSPORT, PENNSYLVANIA, ASSIGNOR, BY MESNE ASSIGNMENTS, TO WALDEMAR GIERTSEN, OF CHICAGO, ILLINOIS.

CHAIN-FEED SAW.

1,110,709.

Specification of Letters Patent.     Patented Sept. 15, 1914.

Application filed November 29, 1911. Serial No. 663,094.

*To all whom it may concern:*

Be it known that I, ARTHUR W. NELSON, a citizen of the United States, residing at Williamsport, in the county of Lycoming and State of Pennsylvania, have invented a new and useful Chain-Feed Saw, of which the following is a specification.

This invention has reference to improvements in sawing machines wherein the feed to the saw is by means of a chain, and its object is to provide a sawing machine of this type wherein the saws may be used in gangs, wherein the saws may be accurately adjusted to the work, wherein lumber may be sawed into numerous strips simultaneously, and wherein the machine is generally improved in structure and operation for the performance of the work for which the machine is especially designed.

In accordance with the present invention there is provided a saw arbor so mounted as to be capable of adjustments whereby a gang of saws mounted in spaced relation on the arbor may be accurately adjusted to the feed structures and the feed mechanism is in the form of an endless chain so related to the saws that the work is fed to the saws positively. The saws are arranged in overriding relation to the chain feed and the latter is grooved for the passage of the teeth of the saw below the plane of the feed so as to cut entirely through the material lodged on the feed chain, and in order that the teeth of the saws may leave the material operated upon in a direction approaching a perpendicular relation to the surface of the material, the active edges of the saws move in a direction away from the feed chain, wherefore there is provided a presser member holding the work against the feed chain immediately adjacent to the exit portions of the saws.

The present invention also contemplates supporting and guiding members for the chain feed in its active run and means for lubricating the chain which is liable to become contaminated with sawdust.

The invention also contemplates improvements in the structure of different parts thereof whereby the chain feed and saw structure are made particularly efficient in operation.

The invention will be best understood from a consideration of the following detailed description, taken in connection with the accompanying drawings forming a part of this specification, with the understanding, however, that while in the drawings there is shown a practical embodiment of the invention the latter is not confined to any strict conformity to the showing of the drawings since it is susceptible of changes and modifications whereby other embodiments are possible while still retaining the salient features of the invention.

In the drawings:—

Figure 1 is a perspective view of the improved machine. Fig. 2 is a plan view thereof. Fig. 3 is a section on the line 3—3 of Fig. 2 with the saw arbor, journal box and some adjacent parts nearer to the observer than the line of section shown in elevation. Fig. 4 is a section on the line 4—4 of Fig. 2. Fig. 5 is a section on the line 5—5 of Fig. 3 with some parts omitted. Fig. 6 is a section on the line 6—6 of Fig. 4 but drawn to a larger scale. Fig. 7 is a section on the line 7—7 of Fig. 6 but drawn to a larger scale. Fig. 8 is a section on the line 8—8 of Fig. 2 but drawn to a larger scale. Fig. 9 is a detail section of an adjusting means.

Referring to the drawings there is shown a frame comprising two main supporting members 1, 2, connected in spaced relation by cross bars 3 and 4, the cross bars 3 being shown as of channel form and connecting the members 1 and 2 near the lower portions of the ends thereof, while the members 4 are shown as of square cross section and seated in recessed portions 5 of the upper edges of the members 1 and 2 near the ends thereof, the members 4 being prolonged beyond the outer face of the member 1 for a purpose which will hereinafter appear. The framework may, of course, be otherwise constructed than as shown and described.

As shown in the drawings the frame members 1 and 2 are of web and flange construction and the member 1 is somewhat higher than the member 2, the latter being formed with an intermediate raised portion 6 for a purpose which will hereinafter appear.

The outer upper edge of the member 1 is formed with an overhanging flange 7 extending substantially the whole length of the member 1 and immediately beneath the flange the member 1 is formed with a bearing face 8 parallel with the flange 7. Secured to the outer face of the member 1 at a lower level than the bearing face 8 is a bracket 9 provided along one edge with a right angle flange 10 by means of which the bracket 9 is secured to the member 1 in any appropriate manner and the bracket 9 carries a wear plate 11.

Secured to the outstanding portions of the bars 4 is an elongated table 12 made fast to the bars 4 by screws 13 or in any other appropriate manner, and this table, which may be provided with stiffening webs about the edges, is provided along one long edge with a longitudinally arranged flange 14 facing the bearing face 8 of the member 1. Secured to the under face of the table 12 is a block 15 traversed by a rod 16 at one end traversing the member 1 and terminating in a threaded end, the other end being squared as indicated at 17 for the application of a suitable tool whereby the rod 16 may be rotated as desired for a purpose that will hereinafter appear.

The wear plate 11 is secured to the bracket 9 by screws 18 and is designed to support a feed chain composed of a series of connected links 19, each link being formed at one end with a tongue 20 and at the other end with parallel ears 21 designed to receive a corresponding tongue 20 and traversed by a pivot pin 22 also traversing the corresponding tongue 20 seated between the ears. The chain is in effect a flat solid metallic link chain of appropriate flexibility, the links being comparatively short.

Each link is formed on one side with a plane face designed to engage against the bearing face 8, while on the other side near one face each link is formed with a tongue 23 elongated in the direction of the length of the link and designed to engage under the flange 14 of the table 12, the expressions of position being with reference to the machine in operative position. Each link is provided on one face with a series of longitudinal parallel grooves 24 consisting of a centrally arranged groove and side grooves spaced from each other and from the central groove, the grooves of each link alining with those of the adjoining links.

On the frame member 1 about midway of the length thereof and on what may be termed the inner face of the leg member are spaced bearings 25 for a spindle 26 which in operation is substantially upright, and this spindle has at the upper end a journal bearing 27 provided with a cap member 28. The journal bearing 27 has formed on one end thereof a frame 29 of substantially rectangular contour and at the end of the frame 29 remote from the bearing 27 there is formed another journal bearing 30 in turn provided with a cap member 31. The bearings 27 and 30 are in alinement and are designed to receive a shaft 32 constituting a saw arbor, the shaft or arbor 32 having fast thereto, within the space defined by the frame 29, a pulley 33 for the reception of a belt, whereby rotative movement may be imparted to the arbor 32, but the belt is not shown in the drawings, belt drive being a common means of imparting motion to saw arbors. Each cap member 28 and 31 is provided with a lubricant receptacles 34 in turn provided with a cover plate 35 held in place by a screw 36.

To stiffen the structure there is provided a brace bar 37 made fast at one end to the spindle 26 near the lower end thereof and at the other end to a lug 38 on the bearing 30.

The saw arbor 32 is prolonged beyond the bearing 27 and there has an annular flange 39 on it so that the arbor may receive a gang of saws 40 separated one from the other by rings 41 all held together and against the flange 39 by a head 42 and clamp nut 43. The saws 40 are spaced in conformity with the spacing of the grooves 24 of the links 19 of the chain, which latter, as will hereinafter appear, constitutes a chain drive and the number of saws may or may not equal the number of grooves in the series, but the spacing of the saws is such as to bring these saws substantially into conformity with respective grooves 24, the arrangement being such that the saws may enter the grooves for an appropriate distance.

In order to determine the relation of the saws to the grooves so far as the depth of entrance of the saws into the grooves is concerned there is provided a screw 44 extending through a suitably tapped boss 45 on one side of the bearing 27 and one end of this screw 44 bears against the top of the member 1, while the other end of the screw is appropriately squared, as shown at 46, or otherwise suitably shaped for the application of a manipulating tool. Because of the spindle 26 and its bearings 25 the screw 44 will move the whole structure carried by the spindle 26 in an up or down direction, so that the saw blades may be appropriately adjusted with relation to their depth of entrance into the grooves 24. To provide for this adjustment the bearing 30 may be arranged a short distance above the upper edge of the frame member 2 and an abutment angle member or bracket 47 is made fast to the upper edge of the raised portion 6 of the member 2, being held thereto by a set screw 48 while that leg of the bracket resting on the raised portion 6 may have a slot 49 formed therein to admit of movement of the bracket 47 with relation to the member 2. To hold the end of the bearing frame carrying the bearing member 30 in adjusted positions, the bracket 47 is traversed by a screw 50 entering the bearing member 30 and when tightened serving to hold the corresponding end of the bearing frame in rigid relation to the member 2 by reason of the bracket 47. Adjacent to the bracket 47 the raised portion 6 of the member 2 is provided with an upstanding lug 51 traversed by a set screw 52, which latter may be provided with a lock nut 53 and the screw 42 bearing against that leg of the bracket 47 containing the slot 49 serves to adjust the bracket 47 when the screw 48 is loosened to turn the bearing frame and the saw arbor carried thereby about the longitudinal axis of the spindle 26, wherefore the saws 40 may be brought into proper relation to the grooves 24 with reference to the planes of travel of the grooves, that is, the planes of rotation of the saws are thereby brought into coincidence with the planes of travel of the respective grooves. The threaded end of the rod 16 engages in the cap member of the upper bearing 25 so that when the saws are adjusted this bearing may be tightened against the spindle 26 clamping it in the adjusted position, wherefore the relation of the saws and grooves having been set will be maintained until purposely changed.

At the ends of the bracket 9 and at a lower level the frame member 1 is provided with bearings for respective shafts 54 and 55, although the shaft 55 may be stationary. These two shafts carry adjacent to the outer wall of the member 1 pulleys 56, 57, respectively, about which the chain made up of the links 19 passes. The pulleys 56 and 57 are shown as provided with polygonal peripheries, they being hexagonal in the particular showing of the drawings, and are shaped into conformity with the links of the chain. The pulley 56 is, as will hereinafter appear, a drive pulley, while the pulley 57 may be simply an idler, being held to the shaft 55 by a set collar 58, or in any other suitable manner. The shaft 55 extends across the space between the members 1 and 2 and is supported at the appropriate end of the member 2 while this shaft carries one end of an arm 59, the other end of which supports an idler pulley 60 over which the drive belt for the pulley 33 may pass. The shaft 54 also traverses the space between the members 1 and 2 and is provided with a suitable journal bearing in the member 2 and extends therebeyond. Keyed to the shaft 54 but outside the member 2, is a gear wheel 61 in mesh with a pinion 62 on a stub shaft 63 fast to and projecting from the outer face of the member 2. The pinion 62 is formed in one piece with a gear wheel 64 carried by the stub shaft 63 and this gear wheel is in mesh with a pinion 65 loosely mounted on the shaft 54, the gear wheel 65 being in one piece with a pulley 66 likewise loosely mounted on the shaft 54. For purposes of protection the member 2 carries a shield 67 in part housing the gearing just referred to. The pulley 66 is designed to be driven by a belt coming from a suitable source of power, while the train of gearing made up of the pinion 65, gear wheel 64, pinion 62 and gear wheel 61 will impart to the shaft 54 a speed of rotation greatly reduced with respect to the speed of rotation of the pulley 66, wherefore the shaft 54 even if ultimately driven from the same source of power as the saw arbor will rotate at a greatly reduced speed. The shaft 54 imparts motion to the chain drive and in practice the direction of motion of this chain drive is from right to left as viewed in Fig. 1, while the saw arbor is rotated in the same direction as the shaft 54 so that the saws will rotate in a counter-clockwise direction as viewed in Fig. 1, and, therefore, the saw teeth where passing along the grooves 24 will move in a direction opposite the direction of travel of the chain.

Carried by the inner face of the frame member 1 on opposite sides of the spindle 26 are bearings 68, 69, respectively, there being two bearings 68 one above the other and two bearings 69 one above the other, and these bearings are shaped to receive and guide bars 70, 71, respectively, the bars being preferably rectangular in cross section and the bearings conforming to such shape, although any arrangement of bars and bearings which will permit longitudinal movement of the bars without rotative movement thereof will answer. The bar 70 has fast to it at the upper end a block 72 from which projects a spindle 73 carrying a roller 74 in operative relation to the upper run of the chain belt or drive. The bar 71 carries at its upper end a block 75 carrying a spindle 76 upon which is mounted a roller 77 in operative relation to the chain belt or drive, the roller 74 being in trailing relation to the saws 40 and the roller 77 being in advanced relation thereto.

The inner face of the frame member 1 is provided with other alined bearings 78 in spaced relation one to the other, and these bearings are provided for a bar 79 similar to the bars 70 and 71 and at what constitutes the upper end of the bar 79 there is provided a spindle 80 carrying a roller 81, while the lower end of the bar 79 is provided with a weight 82 tending at all times to depress the roller 81.

The bar 70 has near its lower end a laterally projecting pin 83 engaged by an arm 84 mounted at one end on a pivot pin 85 projecting from the inner face of the member 1 and at the other end carrying an adjustable weight 86 tending at all times by engagement of the arm 84 with the pin 83 to depress the roller 74. The bar 71 has near its lower end a laterally projecting pin 87 engaged by an arm 88 mounted at one end on a pivot pin 89 projecting from the inner face of the member 1 and near the other end carrying an adjustable weight 90, the weighted arm 88 tending at all times to depress the roller 77.

Mounted on the spindle 73 is a pivot support and overhanging the upper portion of the frame member 1 is an arm 91 provided with a prolongation 92 on which is secured a weight 93 tending at all times to move the arm 91 and its prolongation 92 toward the upper edge of the frame member 1. Fast to, or in one piece with the arm 91 adjacent to its junction with the prolongation 92 is a pendent member 94 extending toward the belt made up of the links 19 in overriding relation thereto and to one side of the gang of saws. The member 94 carries a series of parallel plates 95 in spaced relation one to the other by means of spacing strips 96, the plates and spacing strips being held together and to the member 94 by means of bolts or screws 97. The plates 95 are in operation substantially upright and at the lower ends are beveled, as indicated at 98, away from the oncoming portion of the chain drive as it approaches the saws, while the upmoving portion of the saw blades enter between the plates 95.

Fast to the upper edge of the member 1 adjacent to that end of the member carrying the pulley 57 is a guide strip 99.

Suppose that the parts have all been properly adjusted with a suitable number of saws mounted on the saw arbor and these saws entering the grooves in the links 19 to a suitable depth and in alinement with the grooves, then assuming the saws to be rotating at appropriate speed and the belt made up of the links 19 moving also at appropriate speed, a piece of timber indicated at 100 in Fig. 6 is moved upon the chain drive from the right hand end of the machine as viewed in Figs. 1 and 6 and first engages under the roller 81, the latter being lifted by the material to be treated quite easily, since the weight 82 may be comparatively light. The friction thereby produced against the chain drive will cause the latter to propel the piece of lumber 100 toward the roller 77 which thereupon, under the guidance of the operator, very firmly engages the piece of lumber 100 and holds it against the chain drive with ample force to cause the latter to propel the lumber 100 to the saw. However, just prior to reaching the saw the lumber engages under the bevel ends of the plates 95 and the weight 93 acting on these plates serves to hold that portion of the lumber where presented to the saw in firm engagement with the chain drive, the roller 77 coacting.

It will be observed that the saw in traveling through the lumber is moving upwardly, thus tending to lift the lumber strip away from the chain drive, but this action is overcome and prevented by the effect of the plates 95 urged by the weight 93 and by the roller 77 urged by the weight 90, so that the saws will act upon the lumber without effectively reducing the feeding action of the chain drive, while the sawdust is thrown away from the chain and does not tend to lodge in and clog the grooves 24. As soon as the lumber has passed sufficiently beyond the saws it is engaged by the roller 74 and this last named roller further assists in making the chain drive effective for propelling purposes. It will be observed that the lumber 100 may be severed into numerous strips depending upon the number of saws 40 mounted on the arbor, the saws passing completely through the lumber despite the fact that the lumber is engaged on one face by the driving mechanism and that the saws are directly over such driving member. It is to be observed that the pressure member of which the plates 95 form the active portion engages the lumber at the point where the saw teeth leave it, so that the saw teeth can exert upon the lumber no lifting action which is not directly counteracted by the holding member made up of the plates 95 and coacting parts, this holding member engaging the lumber within the limits of the peripheries of the saws, or so closely to the peripheries of the saws as to effectively prevent the uprunning portions of the saws from lifting the lumber away from the driving member.

Since the chain drive must be rigidly supported to withstand the pressure exerted upon the lumber and through it upon the chain, there is a liability of the production of considerable friction where the chain drive passes over its supports, wherefore the wear plate 11 is provided, and to reduce the friction caused by such engagement, that portion of the drive chain engaging the wear plate 11 is lubricated. To bring this condition about the lower run of the chain has in overriding relation thereto a box 101 made fast to the frame member 1 and that edge of the box toward the oncoming portion of the lower run of the chain is in angle or bevel relation thereto, such edge being indicated at 102, and to this beveled edge there is secured a scraper blade 103 in position to engage those faces of the links 19 remote from the grooved faces thereof, while within the box there is lodged a mass of suitable material indicated at 104, of which waste may be taken as an example, and this material 104 may carry lubricating material of any suitable type. When the machine is in operation those faces of the links 19 which engage the wear plate 11 are being constantly subjected to the scraping action of the blade 103 to remove any adherent material liable to produce friction and immediately afterward the links are brought into wiping relation with the waste 104, whereby lubricating material is evenly spread over the links on the portions which may be termed their rear faces and which faces ultimately pass over the wear plate 11 in engagement therewith, wherefore friction due to the sliding movement of the links over the wear plate or strip is reduced to a minimum.

To determine the limit of travel of the rollers 74 and 77 toward the feed chain the bars 70 and 71 each carries a bracket 105 provided with a set screw 106 positioned to engage the top of the frame member 1 when a predetermined lower limit of travel of the respective roller 74 or 77 has been reached. This limit may be changed at any time by a suitable adjustment of the set screw 106.

What is claimed is:—

1. In a chain feed sawing machine, a table for supporting the work, a feeding chain arranged at one side of the table and comprising an endless series of flat solid metallic links hinged together end to end, each link having a longitudinally grooved active face plane throughout and with the grooves of the links alined throughout the chain, and a saw located above the active run of the feeding chain in close proximity thereto and adapted to have its teeth enter the grooves of the links to a depth below the top of the supporting table, whereby the saw teeth are caused to cut entirely through material lodged on the said chain.

2. In a chain feed sawing machine, a supporting frame, a table carried thereby, the supporting frame and table having coacting guideways, a feeding chain running in the guideways and composed of an endless series of one-piece flat metallic links hinged together at the ends and each link having a plane active face provided with a series of longitudinal parallel grooves extending the full length of the links and the plane faces of the links being movable in substantially the plane of the top of the table, and means for carrying a series of saws above and in close proximity to the active run of the feeding chain with the teeth of the saws entering the grooves of the chain to a depth below the top of the table, whereby the saw teeth are caused to cut entirely through material lodged on the said chain.

3. In a circular saw chain feed sawing machine, a feeding chain composed of an endless series of one-piece flat metallic links, each hinged at its ends to the meeting ends of the next adjacent links and having a plane longitudinally grooved saw receiving working face with the grooves in the working faces of the links alining throughout the chain.

4. In a circular saw chain feed sawing machine, a feeding chain composed of an endless series of one-piece flat metallic links, each hinged at its ends to the meeting ends of the next adjacent links and having a plane longitudinally grooved saw receiving face with the grooves in the working faces of the links alining throughout the chain, and a longitudinal tongue provided on each link along one side of the chain.

5. In a chain feed sawing machine, a supporting frame, and an elongated table carried therein in spaced relation thereto, the frame and the table being each provided with an undercut guiding groove, a feeding chain comprising an endless series of one-piece flat metallic links hinged end to end and at the edges entering the said grooves, each link of the chain having a plane active face with a laterally extended series of closely associated longitudinal grooves therein and alining with the grooves of the adjacent links throughout the length of the chain, and a gang of saws located above the feed chain and adapted to have the teeth thereof enter the groove in the chain to a depth below the top of the supporting table, whereby the saw teeth are caused to cut entirely through material lodged on the said chain.

6. In a chain feed sawing machine, an endless chain made up of one-piece metallic links each plane on the active face and there provided with a series of longitudinal grooves matching those of the adjacent links, each link being directly pivoted at the ends to the next adjacent links and provided along one edge with a laterally projecting tongue, a supporting member for the active run of the chain over which said run travels, a table adjacent the active run of the chain and having an undercut engaging portion for the tongues of the links of the chain, an undercut supporting member for the edge of the chain remote from the tongues, and a saw carrying member for holding a gang of saws in operative relation to the active run of the chain with the teeth of the saws entering the grooves in the chain.

7. In a chain feed sawing machine, an endless chain made up of one-piece solid metallic links, each plane on the active face and longitudinally grooved with the grooves of the links alining throughout the chain, each link being directly pivoted at the ends to the next adjacent links and provided along one edge with a laterally projecting tongue, a supporting member for the active run of the chain over which the said run travels, a table adjacent to the said active run of the chain having an undercut portion for engaging the tongues of the chain, and an undercut member for engaging the other edge of the chain, a saw carrying member for holding a saw above and in operative relation to the active run of the chain with the teeth of the saw entering the grooves in the links to a depth below the top of the supporting table, whereby the saw teeth are caused to cut entirely through material lodged on the said chain.

8. In a chain feed sawing machine, a saw, and a feeding chain composed of an endless series of one-piece metallic links, each hinged at its ends to the next adjacent links and having a flat working face and provided with a longitudinal groove extending the entire length of the links and across the hinge joint and registering with the grooves of the adjacent links to form at the active run of the chain a continuous groove into which the teeth of the saw project, whereby the saw teeth are caused to cut entirely through material lodged on the said chain.

9. In a chain feed sawing machine, a feeding chain composed of an endless series of one-piece metallic links hinged together at their adjacent ends, each link having a flat working face and provided therein with a central longitudinal groove extending across the hinge joint and registering with the grooves of the adjacent links and forming a continuous groove at the active run of the feeding chain, and a centrally arranged saw located above the feeding chain, the teeth of the saw projecting into the said central groove, whereby the saw teeth are caused to cut entirely through material lodged on the feeding chain.

10. In a chain feed sawing machine, a table for supporting the work, a feeding chain comprising an endless series of flat, solid, metallic links hinged together end to end, each link having a flat working face and provided therein with a longitudinal groove extending across the hinge joint, the grooves of the links registering when the links assume a horizontal position so as to form a continuous groove at the active upper run of the feeding chain, said links being of greater length than width, a saw located above the feeding chain and having its teeth projecting into said groove, whereby the saw teeth are caused to cut entirely through lumber lodged on the feeding chain, and rollers mounted above the chain and on each side of the saw to carry the lumber through the saw.

In testimony, that I claim the foregoing as my own, I have hereto affixed my signature in the presence of two witnesses.

ARTHUR W. NELSON.

Witnesses:
J. J. HEINTZ,
GEO. S. KING.